United States Patent [19]
Keith

[11] Patent Number: 5,927,757
[45] Date of Patent: Jul. 27, 1999

[54] HOSE ASSEMBLIES

[75] Inventor: Gordon Keith, Glasgow, United Kingdom

[73] Assignee: Smiths Industries Public Limited Company, London, United Kingdom

[21] Appl. No.: 09/018,043

[22] Filed: Feb. 3, 1998

[30] Foreign Application Priority Data

Feb. 15, 1997 [GB] United Kingdom ............. 9703196

[51] Int. Cl.⁶ ...................................................... A47L 9/24
[52] U.S. Cl. ........................ 285/7; 285/21.1; 285/21.3; 285/124.1; 285/423; 285/903; 285/906; 174/47
[58] Field of Search ................... 285/7, 903, 906, 285/21.1, 21.3, 124.1, 423; 174/47

[56] References Cited

U.S. PATENT DOCUMENTS

| | | | |
|---|---|---|---|
| 3,553,629 | 1/1971 | Brown et al. | 285/7 X |
| 3,962,745 | 6/1976 | Collier | 285/7 X |
| 4,064,355 | 12/1977 | Neroni et al. | |
| 4,165,140 | 8/1979 | Lyman | 174/47 X |
| 4,368,348 | 1/1983 | Eichelberger et al. | |
| 4,517,404 | 5/1985 | Hughes et al. | 285/7 X |
| 5,109,568 | 5/1992 | Rohn et al. | 285/7 X |

FOREIGN PATENT DOCUMENTS

| | | |
|---|---|---|
| 0601981A1 | 6/1994 | European Pat. Off. . |
| 2309190 | 11/1976 | France . |
| 1547114 | 6/1979 | United Kingdom . |
| 2066408 | 7/1981 | United Kingdom . |
| 2258711 | 2/1993 | United Kingdom . |

*Primary Examiner*—Dave W. Arola
*Attorney, Agent, or Firm*—Pollock, Vande Sande & Amernick

[57] ABSTRACT

A vacuum cleaner hose assembly has a corrugated, flexible hose with fittings at opposite ends for connection to the vacuum cleaner suction inlet and to a cleaning head. A tube or cable extends along the assembly for supply of cleaning fluid or electrical power to the cleaning head. The tube or cable is retained with the hose by means of a U-shape channel provided as a separate member bonded to the outside of the hose. The tube or cable extends within the channel as a loose fit so that it can move along the channel on flexing of the hose, thereby helping maintain flexibility of the assembly.

7 Claims, 1 Drawing Sheet

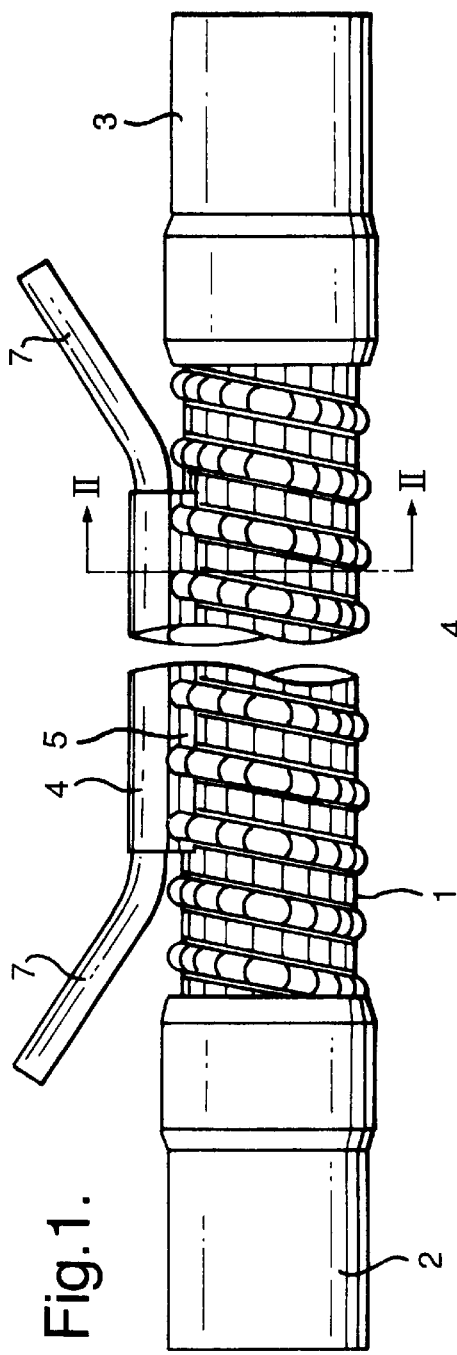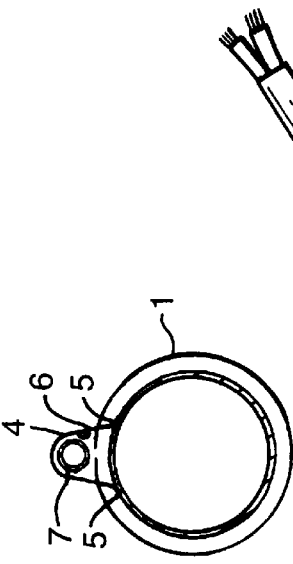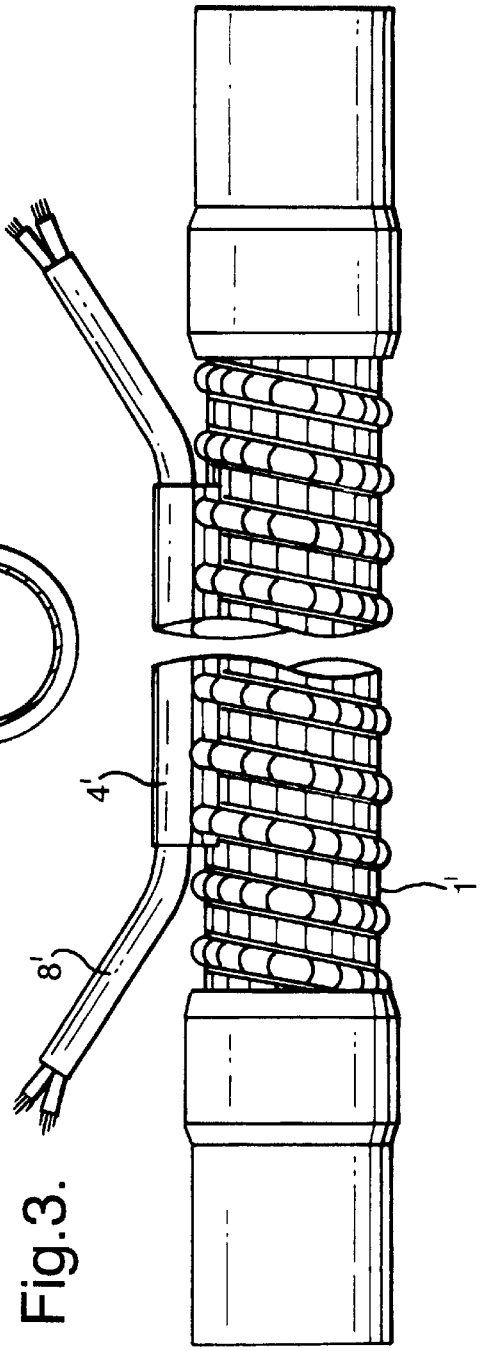

HOSE ASSEMBLIES

BACKGROUND OF THE INVENTION

This invention relates to hose assemblies.

Hose assemblies used with wet and dry vacuum cleaners often include a small-bore tube extending along their length by which cleaning liquid is supplied to the cleaning head. The cleaning liquid tubing is usually attached to the outside of a hose by means of an outer sleeve that is shrunk about the hose and tube, trapping the tube onto the outside of the hose. The problem with this arrangement is that, because the tube is fixed in position, it creates a spine along the hose, restricting its flexibility in some directions. A similar problem also exists with hose assemblies having electrical wires incorporated in a similar way, such as for use in providing electrical power to a beater head.

BRIEF SUMMARY OF THE INVENTION

It is an object of the present invention to provide an improved hose assembly.

According to the present invention there is provided a hose assembly comprising a flexible hose, a flexible channel member extending externally longitudinally along substantially the length of the hose, and an elongate member extending within said channel member and projecting from the channel member at both ends, the elongate member being displaceable along the channel member on flexing of the hose assembly.

The channel member is preferably provided by a U-shape member attached to the hose. The channel member may be bonded to the outside of the hose, such as by a heat bond. The hose is preferably corrugated and may have a fitting at one end adapted for connection to a vacuum cleaner, and a fitting at its opposite end adapted for connection to a cleaning head. The elongate member may be a tube for supply of liquid, or an electrical cable.

Hose assemblies for a vacuum cleaner, according to the present invention, will now be described, by way of example, with reference to the accompanying drawing.

BRIEF DESCRIPTION OF THE DRAWING

FIG. 1 is a side elevation view of one form of assembly;

FIG. 2 is a transverse sectional side elevation view along the line II—II of FIG. 1; and FIG. 3 is a side elevation view of an alternative assembly.

DETAILED DESCRIPTION OF THE PREFERRED EMBODIMENTS

With reference first to FIGS. 1 and 2, the hose assembly is for use with a wet-and-dry vacuum cleaner and comprises a conventional hose 1 corrugated externally and internally to improve its flexibility. The hose 1 is preferably of a plastics material, such as PVC, but may be of any conventional material. Typically, the external diameter of the hose is about 40 mm. At opposite ends, the hose has moulded-on end fittings 2 and 3, for connection respectively to a vacuum cleaner suction inlet and to cleaning head (neither shown). Alternatively, the fittings could be screwed onto the hose, or otherwise attached.

The hose assembly also includes a channel member 4 attached to the outer surface of the hose 1 and extending longitudinally along the hose, terminating just short of the end fittings 2 and 3. The channel 4 is made from a strip of PVC about 30 mm wide (when flattened) and 1.5 mm thick with a hardness of 65 to 75 Shore A. The strip forming the channel 4 is extruded with a U-shape profile having outwardly-projecting edges 5. The edges 5 of the strip are bonded to the outside of the hose 1 by means of a hot air gun, although other techniques could be used, such as a solvent. The channel 4 provides a recess 6 along the outside of the hose 1 in which a flexible tube 7 extends and from which it projects at opposite ends. The tube 7 is of a rubber or plastics material having an external diameter slightly less than the internal dimensions of the recess 6. The tube 7 is not bonded to, or gripped by, the channel member 4, so that it is free to slide along the channel member. In use, the left-hand end of the tube 7 is attached to an outlet spigot of a cleaning fluid pump in the vacuum cleaner, the right-hand end of the tube being attached to the cleaning head, so that cleaning fluid is supplied to the cleaning head.

When the hose assembly is flexed, the channel 4 flexes with it, and the tube 7 is free to move along the channel 4. In this way, the reduction in flexibility of the assembly as a result of the tube, is substantially less than in conventional assemblies where the tube is fixed relative to the hose.

The invention also has application in hose assemblies including alternative elongate members. As shown in FIG. 3, the assembly could include an electrical cable 8' of the kind used to supply power to a vacuum cleaner beater head, the cable extending within the channel member 4' attached to the corrugated hose 1'.

It will be appreciated that the invention is not confined to vacuum cleaner hose assemblies but could be used with other hose assemblies.

What I claim is:

1. A hose assembly comprising: a flexible corrugated hose; a flexible channel extending externally longitudinally along substantially the length of said hose; and an elongate member loosely extending within said channel and projecting from said channel at both ends, said elongate member being displaceable along said channel such that said hose assembly can flex freely, said channel being provided as a separate member of U-shape cross section having an edge projecting transversely from each leg of said U-shape member, said transverse edges being bonded to an outside surface of said hose.

2. A hose assembly according to claim 1, wherein said transverse edges are bonded to said outside surface by a heat bond.

3. A hose assembly according to claim 1, wherein said hose has a fitting at one end adapted for connection to a vacuum cleaner, and a fitting at its opposite end adapted for connection to a cleaning head.

4. A hose assembly according to claim 1, wherein said elongate member is a tube for supply of liquid.

5. A hose assembly according to claim 1, wherein said elongate member is an electrical cable.

6. A vacuum cleaner hose assembly comprising: a flexible corrugated hose having a fitting at one end for connection to a vacuum cleaner suction inlet and a fitting at an opposite end adapted for connection to a cleaning head; a flexible channel provided as a separate member of U-shape cross section extending externally longitudinally along substantially the length of said hose, said flexible channel having a transversely projecting edge on each leg of said U-shape member bonded to an outside surface of said hose; and a cleaning liquid tube loosely extending within said channel and projecting from both ends of said channel such that cleaning liquid can be supplied along said tube to said cleaning head, said cleaning liquid tube being displaceable along said channel such that said hose assembly can flex freely.

7. A vacuum cleaner hose assembly comprising: a flexible corrugated hose having a fitting at one end for connection to a vacuum cleaner suction inlet and a fitting at an opposite end adapted for connection to an electrical beater head; an elongated flexible channel of U-shape cross section bonded to extend externally longitudinally along substantially the length of said hose, said U-shape channel being provided as a separate member that has a transversely projecting edge on each leg of said U-shape member bonded to an outside surface of said hose; and an electrical cable loosely extending within said channel and projecting from both ends of said channel such that electrical power can be supplied along said cable to said beater head, said cable being displaceable along said channel such that said hose assembly can flex freely.

* * * * *